United States Patent
Bonniau et al.

[19]

[11] Patent Number: 5,978,191
[45] Date of Patent: Nov. 2, 1999

[54] ELECTRICAL APPARATUS FOR DIFFERENTIAL PROTECTION WITH A TEST CIRCUIT

[75] Inventors: Michel Bonniau, Dracy Le Fort; Marc Paupert, Chalon Sur Saone, both of France

[73] Assignee: Schneider Electric S.A., France

[21] Appl. No.: 08/913,285

[22] PCT Filed: Mar. 6, 1996

[86] PCT No.: PCT/FR96/00350

§ 371 Date: Sep. 11, 1997

§ 102(e) Date: Sep. 11, 1997

[87] PCT Pub. No.: WO96/28872

PCT Pub. Date: Sep. 19, 1996

[30] Foreign Application Priority Data

Mar. 16, 1995 [FR] France .................................. 95 03297

[51] Int. Cl.[6] .............................................. H02H 3/16
[52] U.S. Cl. ........................... 361/45; 361/115; 361/187; 324/422; 324/424
[58] Field of Search .............................. 361/42, 45, 49, 361/78, 187, 93, 102, 115; 324/418, 420, 422–424

[56] References Cited

U.S. PATENT DOCUMENTS

| | | | |
|---|---|---|---|
| 3,787,708 | 1/1974 | Hobson | 361/44 |
| 3,924,178 | 12/1975 | Lockyer et al. | 324/418 |
| 4,063,299 | 12/1977 | Munroe | 361/45 |
| 4,320,433 | 3/1982 | Yamaki | 361/45 |
| 4,433,293 | 2/1984 | Aoyagi et al. | 324/424 |
| 5,541,800 | 6/1996 | Misencik | 361/45 |

FOREIGN PATENT DOCUMENTS

| | | |
|---|---|---|
| 0264313 | 4/1988 | European Pat. Off. . |
| 0350639 | 1/1990 | European Pat. Off. . |
| 0350825 | 1/1990 | European Pat. Off. . |
| 0367690 | 5/1990 | European Pat. Off. . |
| 0502393 | 9/1992 | European Pat. Off. . |
| 0640995 | 3/1995 | European Pat. Off. . |
| 3902416 | 8/1990 | Germany . |
| 4127291 | 2/1993 | Germany . |
| 4243314 | 6/1994 | Germany . |
| 4306231 | 9/1994 | Germany . |
| 4307811 | 9/1994 | Germany . |
| WO 93/1744 | 9/1993 | WIPO . |

*Primary Examiner*—Michael J. Sherry
*Attorney, Agent, or Firm*—Parkhurst & Wendel, L.L.P

[57] ABSTRACT

A trip device comprising a differential current detection transformer, a trip relay of a breaking mechanism of the circuit breaker and a test circuit for checking the operation of the trip device. The relay comprises a fixed yoke bearing a coil and a blade that is mobile with respect to the yoke. During normal operation of the trip device, the blade is held magnetically in the position pressing against the yoke and when a differential current occurs, the blade actuates the breaking mechanism. The test circuit generates a vibration of the blade, without causing tripping of the mechanism, in order to check its ability to disengage from the fixed yoke. Advantageously, this vibration is obtained by application of a voltage in the form of pulses to the terminals of the coil.

21 Claims, 2 Drawing Sheets

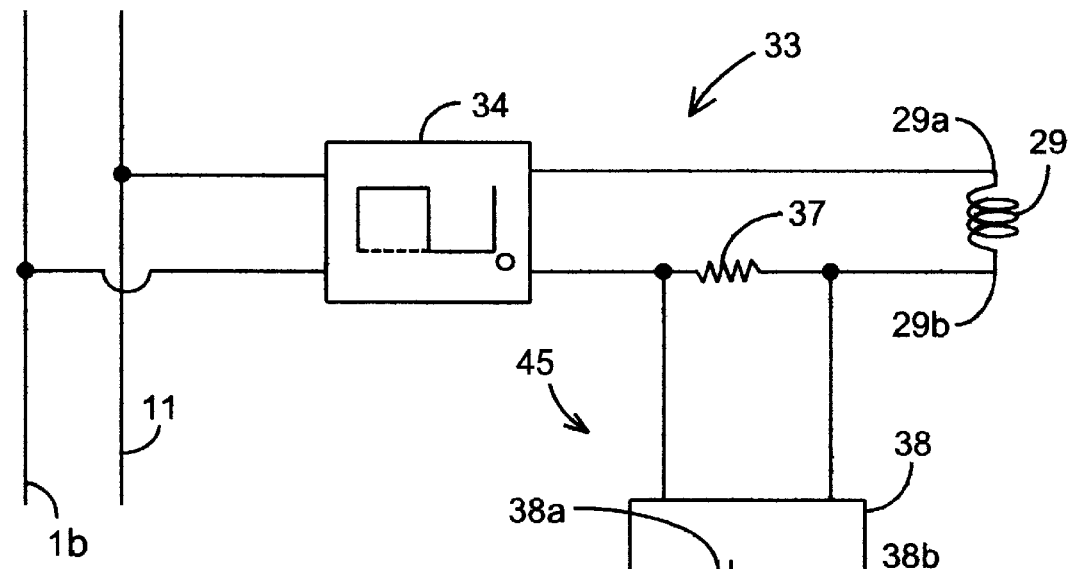
FIG. 2(a)
FIG. 2(b)
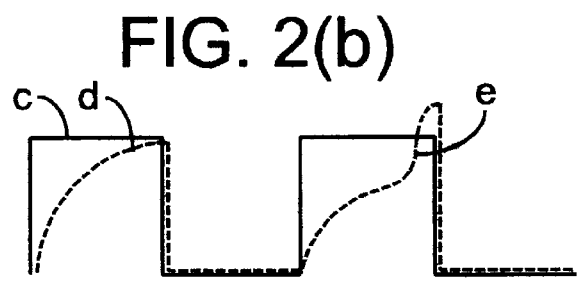

ELECTRICAL APPARATUS FOR DIFFERENTIAL PROTECTION WITH A TEST CIRCUIT

BACKGROUND OF THE INVENTION

The present invention relates to an electrical apparatus for differential protection, notably a circuit breaker or switch, comprising a trip device of the kind comprising a differential current detection transformer, a trip relay of a mechanism such as the breaking mechanism of the circuit breaker, and a test circuit for checking the operation of the trip device, said relay comprising a fixed yoke bearing a coil, and a blade or similar mobile with respect to the yoke, the relay and transformer being electrically connected in such a way that in normal operation of the apparatus the blade is held in the position pressing against the fixed yoke, and that when a differential current is detected by the transformer core, the blade actuates the aforementioned breaking mechanism.

Differential trip devices are apparatuses which are designed based on relays having a great sensitivity. Under certain climatic conditions, the mobile element, that is to say the blade, may stick to the fixed element and prevent the differential protection from operating. In addition, these apparatuses, due to their nature, remain permanently closed in order to provide continuity of service and are only operated very seldom. This is why they are often provided with a test circuit which a checker can operate locally or remotely in order to check the correct operation of the protection.

Electrical apparatuses for differential protection of the kind referred to above are known, as described in the documents FR-2,638,909 or EP-264,313, in which the test circuit is arranged as a branched leakage circuit connected between two connection points of the active conductors of the power system, respectively line-side and load-side of the transformer and mainly comprising a pair of test resistors, a test button of the push-button type and a protection switch. Manual closing of the test button simulates a differential current by insertion of the resistors in the test circuit, which current is detected by the transformer which gives rise to differential tripping by the relay, causing automatic opening of the breaking device contacts. Tripping of the relay in addition causes automatic opening of the protection switch to disconnect the test circuit. This type of apparatus can also comprise a remote tripping circuit, closing of which can simulate a remote isolation fault.

However, each time the test circuit is operated, whether locally or remotely, tripping of the apparatus takes place and the electrical continuity is therefore interrupted. This electrical continuity, which has to be re-established, requires the intervention of an operator whose job it is to reclose the apparatus.

The present invention solves these problems and proposes a differential protection apparatus with a test circuit of simple design, making the checker's job easier while at the same time improving the reliability of the differential protection.

SUMMARY OF THE INVENTION

For this purpose, the object of the present invention is to achieve an electrical apparatus for differential protection of the afore-mentioned kind, characterized in that the afore-mentioned test circuit comprises a first means for generating a vibration of the blade without causing tripping of the apparatus, so as to check the ability of the blade to disengage from the fixed yoke.

According to a particular embodiment of the invention, this first means consists mainly in a means for applying a voltage in the form of pulses to the terminals of the coil of the relay.

According to a particular feature of the invention, the amplitude and width of the pulses are adjusted so as to obtain a vibration of the blade without causing it to open completely.

According to a particular feature, the voltage applied is a square voltage.

According to another feature, the apparatus comprises a second means for measuring the inductance variation at the terminals of the coil, during operation of the first means, a sudden variation of the inductance being characteristic of correct operation of the relay.

Advantageously, this second means measures the variation of the current in the test circuit, during operation of the first means, a sudden variation of the current being characteristic of correct operation of the relay.

According to another embodiment, it comprises a second means for detecting the presence of an over voltage at the terminals of the coil during operation of the first means, this over voltage being characteristic of the ability of the blade to disengage from the fixed yoke.

According to another feature, it comprises a third means for local or remote signalling, electrically connected to the afore-mentioned second means for detection so as to indicate a possible failure of the differential protection.

According to another feature, the afore-mentioned means are operated periodically.

According to another feature, the afore-mentioned means are operated automatically.

Advantageously, the frequency of operation of the afore-mentioned means ranges from a few tens of milliseconds to several months.

But other advantages and features of the invention will become more clearly apparent from the following detailed description which refers to the accompanying drawings given for example purposes only and in which:

BRIEF DESCRIPTION OF THE DRAWING

FIG. 2(a) represents a particular embodiment of the second means of the invention, and FIG. 2(b) represents the voltage and current at the terminals of the coil.

DESCRIPTION OF THE PREFERRED EMBODIMENTS

Figure 1:
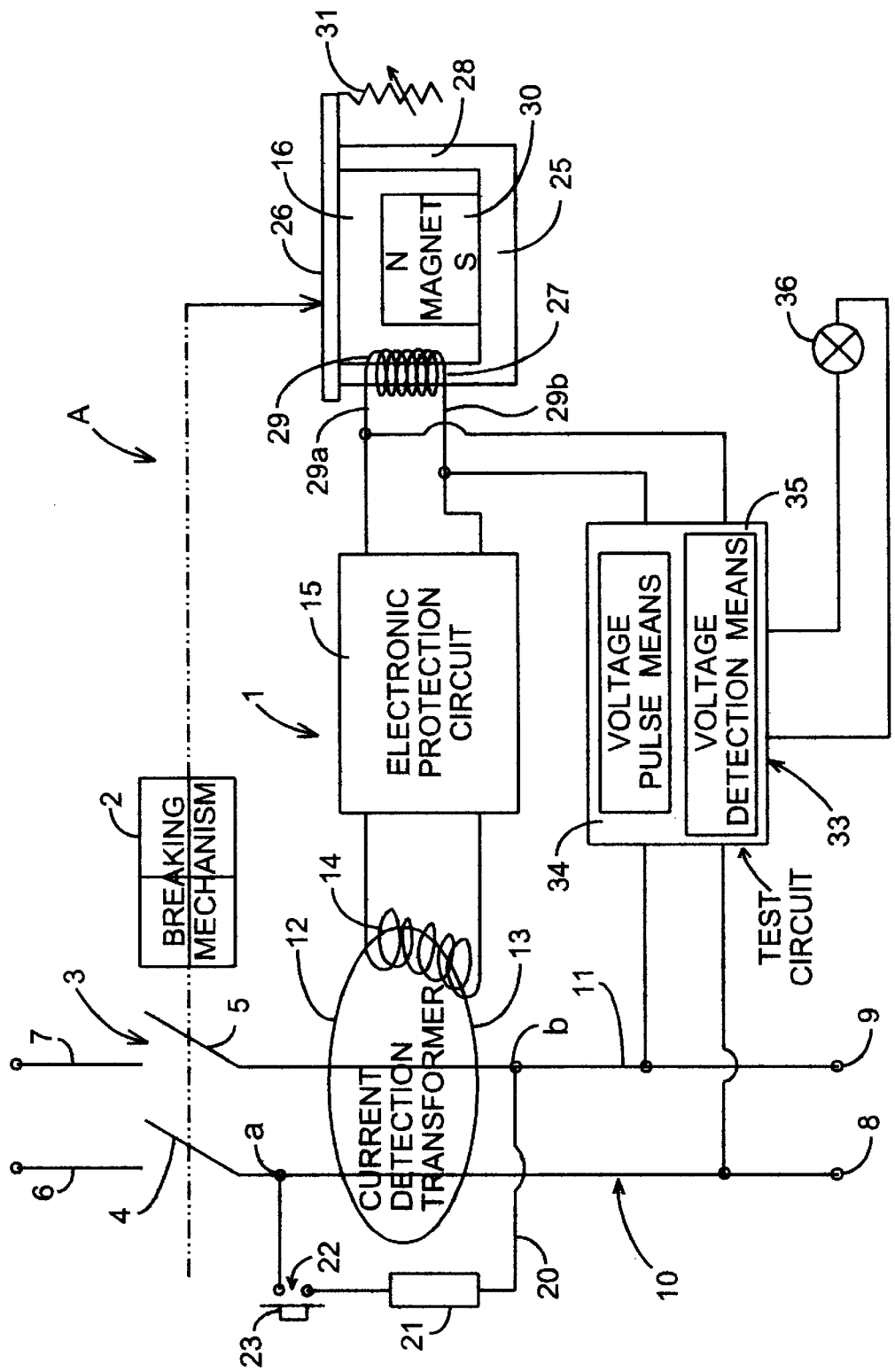
FIG. 1 represents the wiring diagram of an electrical apparatus for differential protection according to a particular embodiment of the invention.

In FIG. 1, an electrical apparatus for differential protection (A) can be seen, notably a circuit breaker or a leakage current switch, which apparatus (A) comprises a differential trip device 1 associated to an breaking mechanism 2 of a two-pole breaking device 3 with breaking contacts 4, 5. The apparatus A is equipped with a first pair of main terminals 6, 7 for connection for example to the load and with a second pair of main terminals 8, 9 for connection to the power supply system. The first terminals 6, 7 are electrically connected to the second terminals 8, 9 by an internal connection circuit with two active conductors 10, 11 in which the contacts 4, 5 of the breaking device 3 are inserted.

The differential trip device 1 comprises a summing transformer 12 and a trip relay 16, said transformer 12 having a core 13 in the form of a toroid surrounding the active conductors 10, 11 for detection of a ground fault current. Depending on the sensitivity of the differential protection, each conductor 10, 11 passes directly through the transformer 12, or is wound on the core 13 in at least one turn to form a primary winding. The core 13 comprises a secondary winding 14 for measuring the differential current, electrically connected by means of an electronic protection circuit 15 to the trip relay 16, which is of the electromagnetic type. The relay 16 cooperates with the afore-mentioned breaking mechanism 2 to bring about automatic opening of the contacts 4, 5 when the intensity of the leakage current detected by the transformer 12 exceeds the differential tripping threshold of the apparatus.

The differential trip device 1 may accessorily be equipped with a conventional manual test circuit 20 containing in series a test resistor 21 and a test switch 22 with test button 23, said circuit 20 being electrically connected to the active conductors 10, 11 at two connection points a, b located on each side of the core 13. The connection point a is situated on the same side as the first terminals 6, 7, whereas the other point b is situated on the same side as the afore-mentioned second terminals 8, 9.

It can be noted that this trip device 1 may also be equipped with a remote control switch (not represented) belonging to a remote tripping circuit, connected in parallel on the manual test circuit 20.

The afore-mentioned trip relay 16 mainly comprises a fixed U-shaped yoke 25 and an actuating blade 26 of the circuit breaking mechanism 2. One 27 of the branches 27, 28 of the fixed yoke 25 bears a coil 29, and the blade 26 is held in position pressed on the fixed yoke 25 against a return spring 31 by means of a permanent magnet 30 located between the branches 27, 28 of the U. Polarized relays 16 of this kind are well known and present the advantage of a low tripping power.

According to a particular embodiment of the invention illustrated in FIG. 1, the afore-mentioned electrical apparatus A comprises an automatic electronic test circuit 33 electrically connected on input to the two active conductors 10, 11, and on output to the terminals 29a, 29b of the coil 29 of the relay 16. This electronic circuit 33 comprises a first means 34 of applying to the coil 29 of the relay 16 a voltage in the form of pulses, the amplitude and width of the pulses being adjusted in such a way as to cause only a vibration of the blade 26 without causing it to open completely, in order to prevent any tripping of the breaking mechanism 2. The successive opening and closing movements of the blade 26 during this vibration will generate an over voltage at the terminals of the coil 29. The circuit 33 therefore comprises a second means 35 for detecting the presence or absence of an over voltage at the terminals of said coil 29. This second means 35 is electrically connected by means of an indicating means 36 designed, when this over voltage is absent, to give warning of malfunctioning of the relay 16 and therefore of the defectiveness of the protection.

It can be noted that this electronic test circuit 33 is advantageously designed in such a way as to generate signals of appropriate shape and of a frequency ranging from several tens of milliseconds to several months. This electronic circuit 33 is preferably itself supplied with the power supply system voltage, whereas the protection circuit 15 may depend on this voltage or not.

According to another embodiment illustrated in FIG. 2a, the test circuit 33 comprises a first means 34 for generating a voltage in the form of pulses (in this case a square voltage) at the terminals of the coil 29 of the relay 16 and a second means 45 for measuring an inductance variation at the terminals 29a, 29b of the coil 29. This second means 45 comprises: a resistor 37 connected in series with the coil 29 of the relay, a branch circuit 38 fitted on input parallel to the terminals of the resistor 37 and formed by a condenser 38a and a resistor 38b connected in series. The branch circuit 38 is connected on output to the input of a diode 39, which is connected on output to an assembly formed by a condenser 40 and a capacitor 41 connected in parallel. One of the terminals of the condenser 40 and of the capacitor 41 is connected to one 38c of the outputs 38c and 38d of the branch circuit 38 and to the ground M, whereas the other terminal of these elements, connected to the diode 39, is connected to the positive pole of an operational amplifier 42 whose negative pole receives a reference voltage. The output of this amplifier 42 is connected to a lamp 43.

The operation of the apparatus according to the invention will be briefly described by the following with reference to the figures.

In normal operation of equality of currents in the active conductors 10, 11, no voltage is induced in the secondary winding 14 of the transformer 12 and the blade 26 is held in the stuck position. When an unbalance occurs between the currents, in this case a differential fault between alternating currents, a fault signal in alternating current form is generated in the secondary winding 14 and this signal is applied via the protection circuit 15 to the coil 29 of the relay 16. This relay 16, by means of the blade 26, causes tripping by acting on the breaking mechanism 2 which causes opening of the circuit breaker contacts 4, 5. In the case where the apparatus A is equipped with a conventional manual test circuit 20, when the operator wants to check correct operation of the trip device 1, local closing of the test switch 20 by the test button 23 (or closing of the remote control switch) generates creation of an artificial differential current resulting in opening of the contacts 4, 5 of the breaking device 3 after differential tripping by the relay 16 and breaking mechanism 2. This tripping interrupts the continuity of service of the electrical apparatus A and requires the action of a checker who has to reclose the apparatus A in order to re-establish this continuity.

On the contrary, in the case where the electrical apparatus A is equipped with a test circuit 33 according to the embodiment of the invention described in FIG. 1, a voltage in pulses is applied periodically to the terminals 29a, 29b of the coil 29 of the relay 16. In case of correct operation of the relay, sending of this voltage results in a vibration of the blade 26 without causing it to open completely. This vibration movement constituted by successive opening and closing movements generates at the terminals 29a, 29b of the coil 29 an over voltage detected by the means 35. The presence of this over voltage enables correct operation of the relay 16 to be confirmed. When on the contrary it is the absence of this over voltage which is detected, this absence being able to be due for example to sticking of the blade 26 on the fixed yoke 25 due to the effect of excessive climatic stresses, a local or remote alarm is actuated in order to announce the defectiveness of the protection.

When the apparatus is equipped with a test circuit 33 according to the second embodiment illustrated in FIG. 2a, the principle consists in measuring the inductance variation resulting from partial opening of the blade 26. The coil 29 of the relay 16 is attacked by a square voltage c (FIG. 2b) of a frequency of a few KHZ (for example 5 KHZ). The current rise is controlled by the inductance of the relay 16 in the closed position (up to the tripping threshold). When the tripping threshold is reached, if the blade of the relay is stuck, the inductance hardly varies at all and the current (d, FIG. 2b) continues to increase continuously. If the blade is not stuck, the inductance varies sharply (decreases) and the current e (FIG. 2b) rises with a steeper gradient. This sudden sharp current variation is detected by the electronic circuit 45 described previously by sending of a corresponding voltage on the positive pole of the amplifier 42 and comparison of this voltage with a reference voltage V. When this sudden variation e of the current is detected, the lamp 43 lights up.

A test of correct operation of the trip relay 16 is thus performed by checking the ability of the mobile core 26 of the relay 16 to disengage from the fixed core 25 during a very short moment, without giving rise to a power supply discontinuity, and without any human checking and reclosing action being necessary any more.

Another advantage for users of electrical installations lies in the fact that periodical operation of the mobile element of the relay avoids the long periods of inaction of the trip device liable to enhance sticking effects and thereby reduce the reliability of the differential protection.

It should be noted that the invention can apply for example to a two-pole differential circuit breaker connected in a single-phase AC power system having a phase conductor and a neutral conductor.

More generally, the invention applies to any switchgear apparatus incorporating a trip device or being associated to a trip device of the kind described above.

Naturally, the invention is not limited to the embodiment described and illustrated herein which has been given as an example only.

On the contrary, the invention covers all the technical equivalents of the means described and combinations thereof if the latter are achieved within the spirit of the invention.

We claim:

1. An electrical apparatus for differential protection by a circuit breaker comprising:
    a trip device which comprises a differential current detection transformer, a trip relay and a breaking mechanism;
    said breaking mechanism comprising a blade;
    said trip relay comprising a fixed yoke with a coil, said blade being moveable between an engaged position pressing against said yoke and a disengaged position spaced away from said yoke;
    said trip relay being electrically connected by the coil to said current detection transformer so that said blade is held in the engaged position during normal operation; and
    a test circuit for checking an operational status of said trip device;
    said test circuit comprising means for generating a vibration of said blade, without moving said blade to the disengaged position that trips said breaking mechanism from said yoke when a differential current is detected by said differential current detection transformer, to verify operability of said blade to disengage from said yoke.

2. The electrical apparatus according to claim 1, wherein said means for generating a vibration further comprises a pulse voltage applied to a pair of terminals of the coil of said trip relay.

3. The electrical apparatus according to claim 2, wherein an amplitude and width of the pulse voltage are adjusted to obtain a vibration of said blade without causing it to completely disengage from said yoke.

4. The electrical apparatus according to claim 2, wherein said applied pulse voltage is a square wave.

5. The electrical apparatus according to claim 1, further comprising a means for measuring a variation of inductance at a pair of terminals of the coil during operation of said means for generating vibration, wherein a sudden variation of the inductance is indicative of proper operation of said trip relay.

6. The electrical apparatus according to claim 5, wherein said means for measuring includes means for measuring a variation of a current in said test circuit during operation of said means for generating a vibration, wherein a sudden variation of the current is indicative of correct operation of said trip relay.

7. The electrical apparatus according to claim 5, wherein said means for measuring includes means for measuring an over-voltage at a pair of terminals of the coil during operation of said means for generating a vibration, said over-voltage being indicative of an ability of said blade to disengage from said yoke.

8. The electrical apparatus according to claim 5, comprising means for providing local and remote signaling, said means for providing local and remote signaling being electrically connected to said means for measuring a variation of inductance to indicate a possible failure of said differential protection.

9. The electrical apparatus according to claim 6, comprising means for providing local and remote signaling, said means for providing local and remote signaling being electrically connected to said means for measuring a variation of inductance to indicate a possible failure of said differential protection.

10. The electrical apparatus according to claim 1, wherein said means for generating a vibration is operable periodically.

11. The electrical apparatus according to claim 5, wherein said means for generating a vibration and said means for measuring a variation of inductance are operable periodically.

12. The electrical apparatus according to claim 7, wherein said means for generating a vibration and said means for measuring are operable periodically.

13. The electrical apparatus according to claim 8, wherein said means for generating a vibration, said means for measuring and said means for providing local and remote signaling are operable periodically.

14. The electrical apparatus according to claim 1, wherein said means for generating a vibration is operable automatically.

15. The electrical apparatus according to claim 5, wherein said means for generating a vibration and said means for measuring are operable automatically.

16. The electrical apparatus according to claim 7, wherein said means for generating a vibration and said means for measuring are operable automatically.

17. The electrical apparatus according to claim 8, wherein said means for generating a vibration, means for measuring, and means for providing local and remote signaling are operable automatically.

18. The electrical apparatus according to claim 1, wherein said means for generating a vibration is repeatably operable over a time interval of a few tenths of a millisecond to several months.

19. The electrical apparatus according to claim 5, wherein said means for generating a vibration and said means for measuring are repeatably operable over a time interval of a few tenths of a millisecond to several months.

20. The electrical apparatus according to claim 7, wherein said means for generating a vibration and said means for measuring are repeatably operable over a time interval of a few tenths of a millisecond to several months.

21. The electrical apparatus according to claim 8, wherein a said means for generating a vibration, means for measuring, and means for providing local and remote signaling ranges are repeatable operable over a period of a few tenths of a millisecond to several months.

\* \* \* \* \*